(12) United States Patent
Neilan et al.

(10) Patent No.: US 8,078,912 B2
(45) Date of Patent: Dec. 13, 2011

(54) SELF-SERVICE TERMINAL

(75) Inventors: Michael J. Neilan, Dundee (GB); Gordon Chisholm, Perth (GB)

(73) Assignee: NCR Corporation, Duluth, GA (US)

( * ) Notice: Subject to any disclaimer, the term of this patent is extended or adjusted under 35 U.S.C. 154(b) by 320 days.

(21) Appl. No.: 12/399,309

(22) Filed: Mar. 6, 2009

(65) Prior Publication Data
US 2009/0199053 A1    Aug. 6, 2009

Related U.S. Application Data

(63) Continuation-in-part of application No. 12/012,166, filed on Jan. 31, 2008, now Pat. No. 7,774,649.

(51) Int. Cl.
*G06F 11/00* (2006.01)
(52) U.S. Cl. ......................................................... 714/22
(58) Field of Classification Search .................... 714/22, 714/23
See application file for complete search history.

(56) References Cited

U.S. PATENT DOCUMENTS
2002/0123966 A1   9/2002   Luke et al.

FOREIGN PATENT DOCUMENTS
EP   1 659 548 A   5/2006
EP   1 672 595 A   6/2006

*Primary Examiner* — Bryce Bonzo
(74) *Attorney, Agent, or Firm* — Paul W. Martin

(57) ABSTRACT

A self-service terminal comprises a pc core; at least one module coupled to the pc core; a control application executing on the pc core for controlling the operation of the terminal; and a management application executing on the pc core. The management application is arranged to (i) monitor state of health of the pc core, the control application, and the at least one module, (ii) detect a fault state at any of the pc core, the control application, and the at least one module, (iii) monitor the control application to ascertain if a filter criterion is satisfied, and (iv) transmit a fault signal from the terminal only if the filter criterion is not satisfied.

20 Claims, 7 Drawing Sheets

SELF-SERVICE TERMINAL

This application is a continuation-in-part application of application Ser. No. 12/012,166 filed Jan. 31, 2008 now U.S. Pat. No. 7,774,649.

TECHNICAL FIELD

The present invention relates to a self-service terminal (SST), such as an automated teller machine (ATM).

BACKGROUND

ATMs are public access terminals that provide users with a secure, reliable, and convenient source of cash and other financial transactions in an unattended environment.

An ATM typically comprises a paneled chassis housing a plurality of interconnected modules for performing user interface, transaction, and management functions for the ATM. Typical user interface modules include a display module, a keypad module, and a card reader module; typical transaction modules include a cash dispenser module, and a statement printer module; and typical management modules include a service operator panel, a controller module, a communications module, and a journal printer module.

The ATM controller module (typically based on a PC core) has an ATM controller application program including software drivers for the modules in the ATM, and ATM controller software to manage:

(1) fault prediction and management (state of health) for the ATM modules;

(2) secure communications between the controller module and other modules, and between the ATM and both a remote transaction authorization server and a remote state of health management system server;

(3) transaction flow, business logic, and presentation of information to an ATM user (customer or service personnel) or an ATM server.

For ATMs located on Internet Protocol (IP) networks, when an ATM device or module changes from a good working state to a problem state, a Simple Network Management Protocol (SNMP) agent will send a message to a remote management system that monitors the state of health of the ATM. The signal is sent via the communications module, which is controlled by the controller application. This level of fault/problem reporting is required for efficient management of the ATM. As part of this system each device or module sends state of health information to the PC core. This is either done in response to a request from the core or automatically in response to an event, the latter utilizing SNMP traps.

Service personnel sometimes have to open up, and/or power down a device or module in an ATM, without powering down the entire ATM, for example, to replace a part of a module. In addition, a control application executing on the ATM may attempt to reset a module to correct a fault. When one of these activities occurs, the PC core and its software will still be fully operational. In such a planned and controlled activity, the management system will be flooded with status messages from the ATM that are expected and transient. This will cause the ATM to erroneously transmit these messages to a remote management center, which may dispatch a service engineer if the status messages appear to require such a response. This causes unnecessary communications between the ATM and the management center server, as well as adding unnecessary entries to error logs, and may be very costly and inconvenient to service companies if engineers are sent out erroneously.

It is among the objects of an embodiment of the present invention to obviate or mitigate one or more of the above disadvantages, or other disadvantages associated with prior art self-service terminals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention there is provided a self-service terminal comprising:

a pc core;

at least one module coupled to the pc core;

a control application executing on the pc core for controlling the operation of the terminal; and a management application executing on the pc core and arranged to (i) monitor state of health of the pc core, the control application, and the at least one module, (ii) detect a fault state at any of the pc core, the control application, and the at least one module, (iii) monitor the control application to ascertain if a filter criterion is satisfied, and (iv) transmit a fault signal from the terminal only if the filter criterion is not satisfied.

The management application may use a context filter to monitor the control application. A context filter may be implemented in software as an object or in any other convenient manner.

As used herein, the term pc core refers to a processor on a motherboard having associated memory for controlling the operation of the self-service terminal. The pc core may also include other standard components on a motherboard, such as one or more USB ports, and may also include storage, such as one or more disk drives, solid state disks, or the like.

The filter criterion may be satisfied if at least one of a plurality of different conditions is satisfied. Alternatively, the filter criterion may require multiple conditions to be fulfilled.

A condition of the filter criterion may be satisfied if the self-service terminal is in a supervisor mode. A supervisor mode may be a mode in which service personnel (such as a service engineer) can control the at least one module and the pc core to perform maintenance, diagnostic, or replenishment tasks.

Some self-service terminals, such as automated teller machines (ATMs) can be in either a transaction mode (in which customers can execute transactions) or in a supervisor mode (in which authorized personnel can perform management tasks on the terminal). When an ATM is in supervisor mode, it is common for many fault states to be generated because modules may be removed, opened, and the like, causing sensors to change state, thereby triggering a fault state.

In one embodiment, no fault signals may be transmitted when the terminal is in supervisor mode. However, when the terminal is returned to transaction mode, then if the fault is still present then a fault signal may be sent. In other embodiments, a fault signal may be sent while the terminal is in supervisor mode, for example, if the fault signal relates to media (such as receipt paper) that needs replenished. In such cases, the filter criterion may include a condition—do not send a fault signal if in supervisor mode and a fault state does not relate to replenishment.

Alternatively, or additionally, a condition of the filter criterion may be satisfied if the control application has issued a reset command to the at least one module. Such a reset command can be issued by an ATM control application in accordance with the CEN (European Committee for Standardization) 3.0 standard. This enables the management application to wait until the reset has been implemented to ascertain if the fault state is still present. If the reset command resolves the fault state, then no fault signal requires to be sent.

The control application may comprise: a platform portion for controlling the modules in the terminal; a transaction portion for executing customer transactions; and a maintenance portion for providing diagnostic and maintenance support to service personnel using the terminal.

The platform portion may comprise an operating system (such as a non-proprietary operating system) for controlling industry standard computing devices and modules, and proprietary module operation components for controlling proprietary devices and modules, so that the platform provides an enhanced operating system for the terminal.

The management application may monitor the platform portion, the transaction portion, the maintenance portion, and the at least one module.

Alternatively, or additionally, a condition of the filter criterion may be satisfied if the maintenance portion is executing when the fault state is detected. In such embodiments, the filter criterion may not be satisfied if a media replenishment fault state occurs while the maintenance portion is executing.

Alternatively, or additionally, a condition of the filter criterion may be satisfied if a module reset command has been issued (either by the control application or by service personnel) to reset the at least one module. Such a module reset command may be implemented by stopping the power supply to the at least one module for a short period of time.

Alternatively, or additionally, a condition of the filter criterion may be satisfied if a USB reset command has been issued.

Alternatively, or additionally, a condition of the filter criterion may be satisfied if a module reset command has been issued.

Alternatively, or additionally, a condition of the filter criterion may be satisfied if the control application is out of service.

The filter criterion may include predefined conditions and/or conditions developed by the terminal using machine learning or other adaptive techniques. The filter criterion may be implemented by a rules-based engine configured by an authorized user, or configured dynamically by software based on machine learning techniques (for example, using an artificial neural network).

The management application may store fault states in a log for subsequent review, even if the fault states are never communicated as fault signals.

The terminal may transmit fault signals corresponding to fault states not satisfying the filter criterion to a remote management server in response to a request for these fault signals or on a periodic basis (for example, daily, weekly, monthly, or the like).

The terminal may include a plurality of modules, each module being monitored by the management application.

The management application may include an SNMP (simple network management protocol) agent operable to send a trap as a fault signal if the filter criterion is not satisfied.

The management application may include windows management instrumentation (WMI) agents for implementing state of health management functions.

The management application may cache a received fault state and compare it with a subsequent state when the filter criterion is no longer satisfied. Alternatively, the management application may store or delete a fault state satisfying the filter criterion, and rely on receiving another fault state when the filter criterion is not satisfied to indicate that the fault is not a transient fault induced by a recovery operation (initiated by the ATM or service personnel using the ATM).

The management application may allow a recovery agent (which may be the control application, or a component thereof) to register with the management application. In response to a valid registration request, the management application may automatically add one or more conditions to the filter criterion based on information provided in the registration request.

As used herein, a "device" is typically a replaceable part of a "module"; in other words, most modules comprise a plurality of devices. For example, in a card reader module, there are sensors (each a device) for sensing the location of an inserted card, for detecting a width of an inserted card, and the like.

It should now be appreciated that embodiments of the present invention are operable to ascertain whether to transmit a fault signal or not based on one or more conditions relating to the current state of the terminal. This enables the terminal to avoid flooding a remote management server with fault states that are temporary or have been induced as a result of an authorized person or the control application attempting to repair, maintain, diagnose, or replenish the terminal. In some embodiments, only if a fault state persists after such operations are concluded, or if the fault state is unrelated to such operations, will a fault signal be transmitted. This greatly reduces the amount of redundant network traffic and wasted resource allocation.

According to a second aspect of the present invention there is provided a method of operating a self-service terminal comprising a pc core and at least one module coupled to the pc core, the method comprising:

monitoring state of health of the pc core and the at least one module;

detecting a fault state at either of the pc core and the at least one module, monitoring the control application to ascertain if a filter criterion is satisfied, and transmitting a fault signal from the terminal only if the filter criterion is not satisfied.

The filter criterion may be satisfied by any one or more of the conditions listed above in relation to the first aspect of the invention, or any other convenient condition.

The method may further include storing detected fault states in a log, even if no fault signal is sent for those fault states.

The method may further comprise transmitting the detected fault state log to a remote management system in response to a request therefore or on a periodic basis.

According to a third aspect of the present invention there is provided a self-service terminal comprising a pc core and at least one module, which can be powered down independently of the pc core; the terminal having a control application and an agent arranged to monitor the fault state of the at least one module and cause a fault signal to be sent from the terminal when the fault state of the at least one module is characteristic of a problem with the at least one module, wherein the agent is arranged to determine if the module has been powered down, whereupon the fault signal is buffered until the module is powered up and a determination as to the fault state of the module is again made and the fault signal is only sent if the fault state is still characteristic of a problem with the at least one module.

There may be a plurality of modules and each module has an associated agent.

The agent may comprise an SNMP agent.

The at least one module may be selected from: a display module, a keypad module, a card reader module, a cash dispenser module, a statement printer module; a controller module, a cash accept module, a communications module and a journal printer module.

The fault signal may be arranged for detection and decoding by a remote state of health monitoring facility.

In one embodiment the self-service terminal may be an automated teller machine (ATM).

The agent may be arranged to determine if the at least one module has been powered down by ascertaining when the terminal is placed in a diagnostic mode; loss of power to the at least one module being classified as a power down when the terminal is in said diagnostic mode.

As referred to herein the term "powered down" is intended to mean an intentional power down or shut down of the module by the controller application or a field engineer or the like. It is intended to differentiate from an erroneous shut down of the module due to a problem or fault with the module.

According to a fourth aspect of the present invention there is provided a method of operating a self-service terminal comprising a pc core and at least one module that can be powered down independently of the pc core; the terminal having a control application and an agent arranged to monitor the fault state of the at least one module and cause a fault signal to be sent from the self-service terminal when the fault state of the at least one module is characteristic of a problem with the at least one module; the method including: determining if the module has been powered down; if the module has been powered down buffering the fault signal; powering up the module; and determining the fault state of the module again; and sending a fault signal only if the fault state is still characteristic of a problem with the at least one module As referred to herein, an "agent" is a software entity comprising code, and optionally data, which can be used to perform one or more operations in a computing environment. An agent performs operations with some degree of independence and autonomy, and presents a consistent interface to other software entities, such as other agents.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
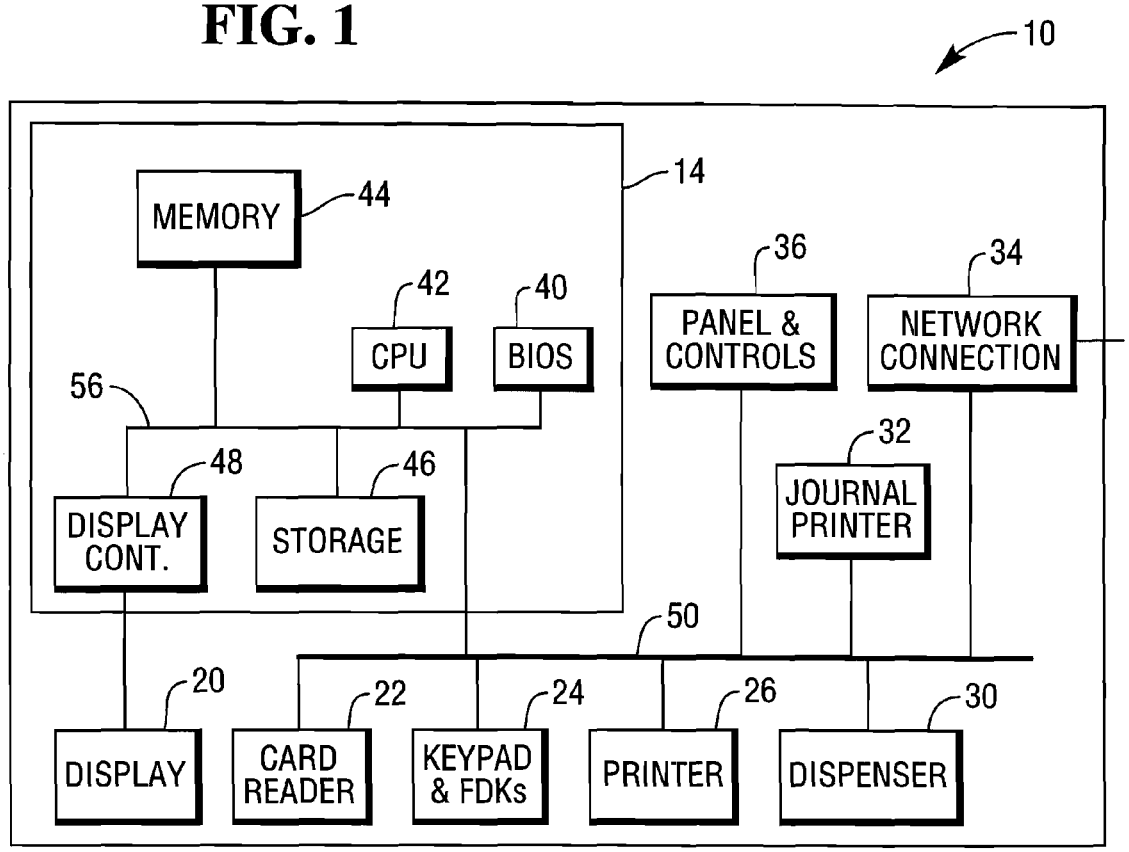
FIG. 1 is simplified schematic diagram of the architecture of a self-service terminal in accordance with one embodiment of the present invention.

Reference is first made to FIG. 1, which is a simplified block diagram of the architecture of an SST 10, in the form of an ATM.

The ATM 10 comprises a plurality of modules for enabling transactions to be executed and recorded by the ATM 10. These ATM modules comprise: a controller module 14, a display module 20, a card reader/writer module 22, an encrypting keypad and FDK (function defined keys) module 24, a receipt printer module 26, a cash dispenser module 30, a journal printer module 32 for creating a record of every transaction executed by the ATM 10, a network connection module 34 (in the form of a network card) for communicating with remote servers (not shown in FIG. 1), and a service operator panel 36.

The controller 14 (also referred to as a pc core) comprises a BIOS 40 stored in non-volatile memory, a microprocessor 42, main memory 44, storage space 46 in the form of a magnetic disk drive, and a display controller 48 in the form of a graphics card.

The display module 20 is connected to the controller module 14 via the graphics card 48 installed in the controller module 14. The other ATM modules (22 to 36) are connected to the ATM controller 14 via a device bus 50, in the form of USB (Universal Serial Bus).

Figure 2:
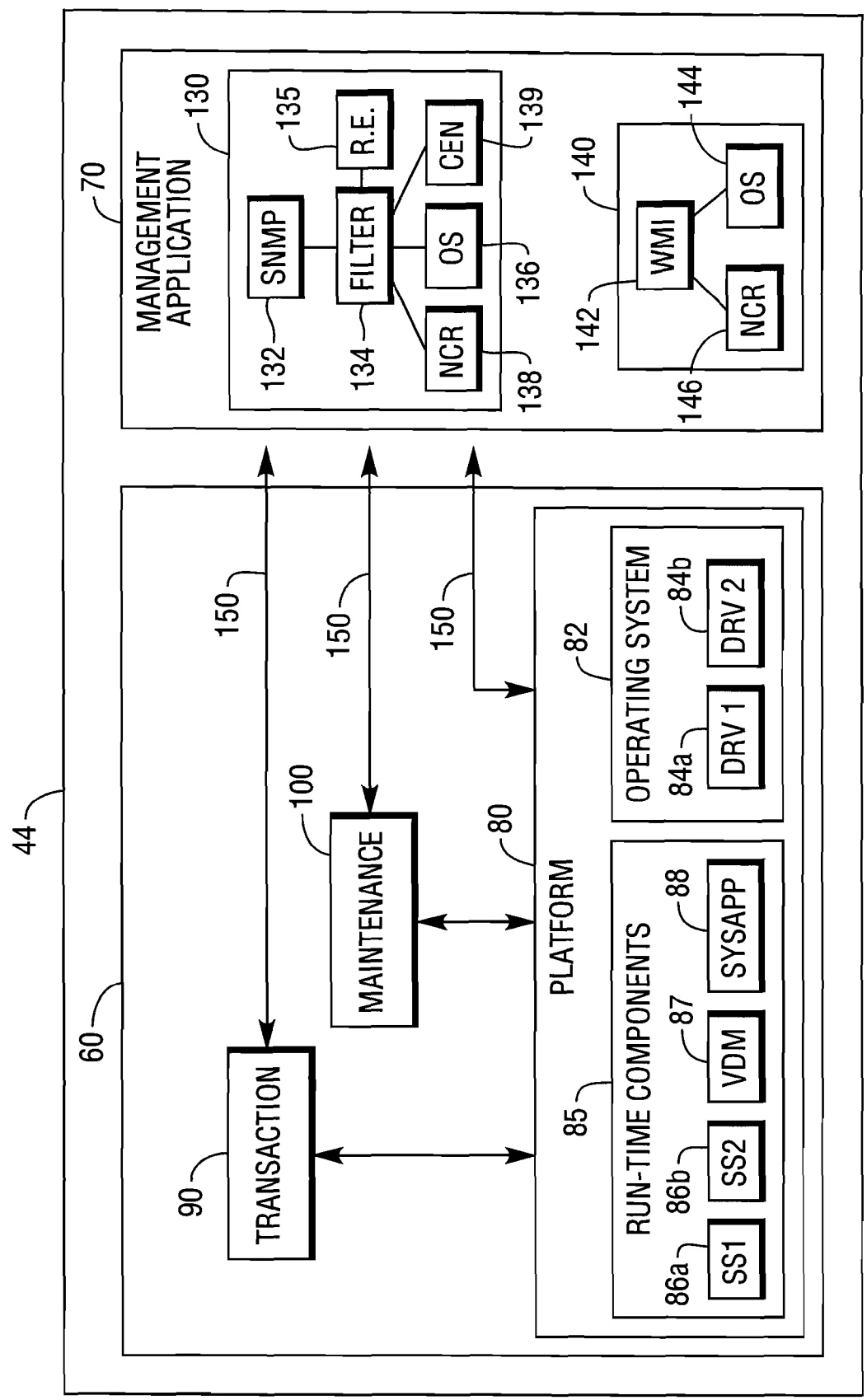
FIG. 2 is a simplified schematic diagram showing the software architecture of a control application and a management application executing in memory of the terminal of FIG. 1.

Reference will now also be made to FIG. 2, which is a schematic diagram showing the software architecture of a control application 60 and a management application 70 executing in memory 44.

The control application 60, comprises a platform portion 80 for controlling the modules in the terminal, a transaction portion 90 for executing customer transactions; and a maintenance portion 100 for providing diagnostic and maintenance support to service personnel working on the ATM 10. The control application may be provided as a single monolithic program, as separate programs, as a collection of objects, or in any other convenient form.

When the ATM 10 is powered up, a booting-up process is performed, in which the main memory 44 is loaded with an operating system kernel 82. In this embodiment, the operating system is a Windows XP (trade mark) operating system, available from Microsoft Corporation (trade mark). The operating system includes a plurality of device drivers 84a,b, . . . for interfacing with standard computing devices such as the magnetic disk drive 46, the display 20, a serial port, a parallel port, and such like. As is well known in the art, the operating system kernel 82 is responsible for memory, process, task, and disk management, and includes routines for implementing these functions.

The microprocessor 42 also loads proprietary run-time components 85 into the main memory 44. In this embodiment, the runtime components 85 are a set of APTRA (trade mark) XFS components, available from NCR Corporation, 1700 S. Patterson Blvd., Dayton, Ohio 45479, U.S.A. The run-time components 85 provide a range of programming facilities specific to self-service terminal devices and services.

One function of the run-time components 85 is to enhance the operating system 82 so that the operating system 82 and run-time components 85 together provide high level access to all of the devices and modules, including both standard computing devices (via the operating system 82), and non-standard computing devices (via the run-time components 85). Thus, the combination of the run-time components 85 and the operating system 82 can be viewed as providing a complete ATM operating system (referred to herein as the platform 80).

The run-time components 85 comprise a plurality of self-service device drivers 86a,b, . . . that interface with self-service specific devices. Although only two device drivers 86 are shown, there are many device drivers in the run-time components 85, one for each self-service specific module, such as the card reader 22, the receipt printer 26, the encrypting keypad and FDKs 24, and the cash dispenser 30. Furthermore, there are many more devices and modules in an ATM than those described herein, for example there are more standard computing devices such as serial ports (for example, a USB port) and a parallel port, there may also be more self-service devices and modules, such as a statement printer, a cash accept module, and the like. These devices and modules are not discussed herein because they are not essential to an understanding of the invention.

The run-time components 85 also include support files (not shown) for use with the self-service drivers 86 to allow each device or module to operate. For each self-service module, the driver 86 and any associated support files enable that module to be operated, tested, maintained, and configured. The run-time components 85 also include drivers to facilitate encrypted communication between the modules, for example, between the card reader 22 and the controller 14, between the printer 26 and the controller 14, and such like.

If a new module is to be added to the ATM 10, then a corresponding driver and any associated support files are also added. Thus, the run-time components 85 provide the environment needed for the ATM's self-service modules to be operated and maintained.

The microprocessor 42 also loads into memory 44 the transaction program 90 for executing customer transactions and the maintenance program 100 for providing diagnostic and maintenance support to service personnel working on the ATM 10.

As is known in the art, the transaction program 90 presents a sequence of screens on the display module 20 to a customer at the ATM 10, collates information from the customer (for example, customer account information from a customer's ATM card, transaction request, and the like), obtains authorization for a transaction request from a remote authorization host (not shown in FIG. 2), and instructs the modules within the ATM 10, as needed, to fulfill an authorized transaction.

As is also known in the art, the maintenance program 100 provides service personnel with information on the service panel 36, and enables diagnostic tests to be performed on, and information to be retrieved from, the modules within the ATM 10. The maintenance program 100 implements this by accessing a vendor-dependent mode object 87 within the run-time components 85, which in turn accesses a maintenance object 88 (referred to as SysApp in the NCR APTRA suite of run-time objects). The vendor dependent mode object 87 allows maintenance programs other than those provided by ATM vendors to be used to manage modules within an ATM. This may be desired by a financial institution that owns ATMs provided by multiple different ATM vendors, but uses a common maintenance program for all of its ATMs.

The service panel 36 includes a mode switch that instructs the transaction program 90 to cease offering transactions on the display module 20 (after concluding any transaction currently in progress), and transfer control to the maintenance program 100. This is referred to as entering supervisor mode. When service personnel have completed their desired replenishment, maintenance, or diagnostic tasks, then they press the mode switch to return control to the transaction program 90. This is referred to as returning to transaction mode.

The combination of the platform 80, the transaction program 90, and the maintenance program 100 is referred to herein as the control application 110.

The microprocessor 42 also loads into memory 44 the management application 70 for collating management information from the modules within the ATM 10, and for sending and receiving management messages.

Figure 3:
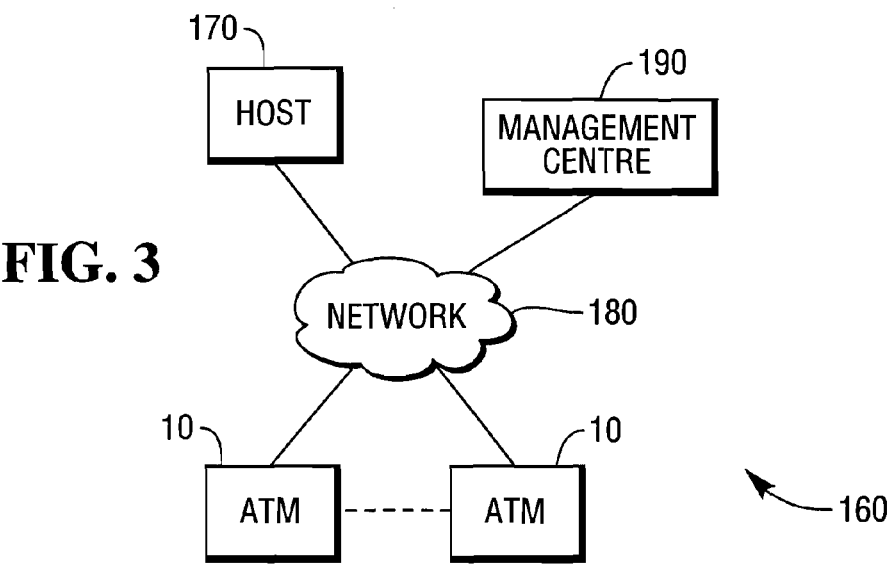
FIG. 3 is a schematic diagram of a network of self-service terminals including the self-service terminal of FIG. 1 and a remote management center.

Reference will now also be made to FIG. 3, which illustrates a network 160 of ATMs 10. The ATMs 10 are connected to an authorization host 170 by an IP network 180, and are also connected to a remote management center 190 by the IP network 180. The management application 120 in the ATM 10 communicates with the remote management center 190 to send status information as requested by the remote management center 190, and also to send fault signals in response to a fault condition being detected, as will be described in more detail below.

The management application 70 comprises an SNMP (simple network management protocol) portion 130 and a WMI (windows management instrumentation) portion 140. Both SNMP and WMI are industry-standard facilities that can be extended and configured for proprietary systems.

The SNMP portion 130 comprises a non-proprietary portion 132 that handles communications, creating traps, and the like. The SNMP portion 130 also includes a context filter 134 that stops fault states from being transmitted as traps under certain circumstances (if a filter criterion is met). The context filter 134 has an associated rules engine 135 that stores conditions relating to the filter criterion, as will be described in more detail below. The SNMP portion 130 also includes one or more non-proprietary objects 136, one or more proprietary objects 138, and a CEN object 139.

The non-proprietary objects 136 are typically in the form of DLLs and are used for communicating with industry-standard devices and modules within the ATM 10, such as USB ports, magnetic disk drives, and the like. The proprietary object 138 is typically also in the form of a DLL and is customized for proprietary modules in the ATM 10 (or modules with proprietary features), such as the card reader 22, the encrypting keypad 24, the cash dispenser 30, and the like. The CEN object 139 communicates with CEN XFS service providers (part of the run-time components 85) in appropriate modules (for example, the cash dispenser module 30) using an interface defined by the CEN standard.

The WMI portion 140 includes a non-proprietary (that is, industry-standard) portion 142 that handles collation of management information from the modules in the ATM 10 according to the WMI standard. In addition, the WMI portion 140 includes an object 144 that is used for non-proprietary devices and modules, and a proprietary object 146 that is configured for proprietary devices and modules.

The management application 70 communicates with the platform 80, the transaction program 90, and the maintenance program 100 to ensure that the management application 70 is aware of the state (context) of these programs.

Figure 4:
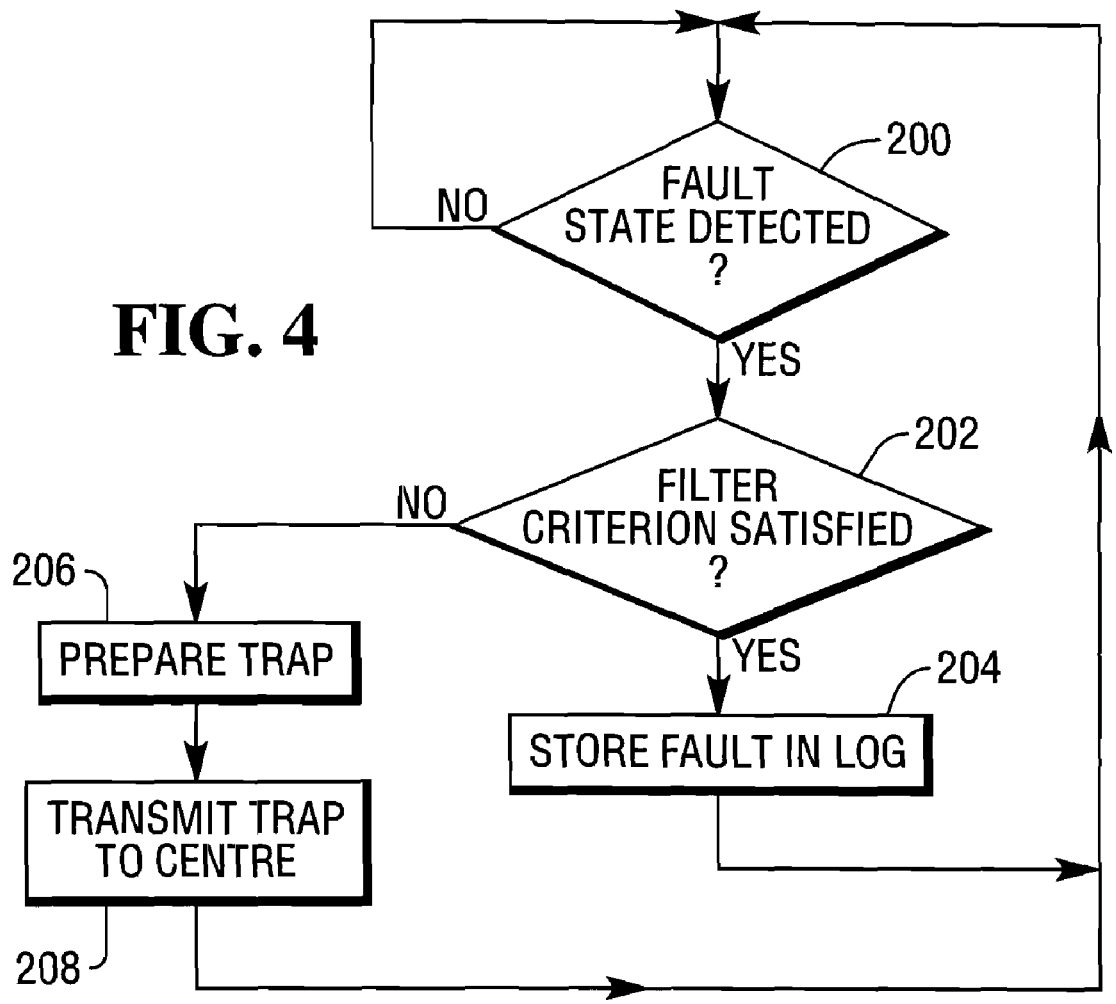
FIG. 4 is a flowchart illustrating steps involved in deciding whether to send a fault signal from the terminal of FIG. 1 to the remote management center of FIG. 4.

The operation of the context filter 134 will now be described with reference to FIG. 4, which is a flowchart illustrating steps involved in deciding whether to send a fault signal (referred to as a trap) to the remote management center 190.

A fault state in one of the modules or in the controller 14 is detected in the same way as is known in the art (step 200). Once a fault state has been detected, the context filter 134 ascertains if a filter criterion has been satisfied (step 202).

This involves accessing the rules engine 135 that compares the status of predefined software and signals within the ATM 10 to conditions in the filter criterion to ascertain if any of these conditions is satisfied. For example, one condition may be satisfied if service personnel are currently using the maintenance program 100 (that is, if the ATM 10 is in supervisor mode). However, since these service personnel may perform tests on the modules, it is possible, for example, that the receipt printer module 26 may become low in paper as a result of printing test receipts. In such a case, the condition may not be satisfied. In other words, the condition may require that the fault state is not a media replenishment fault.

Another condition may be satisfied if the transaction program 90 or the maintenance program 100 has issued a reset command to one or more of the modules in the ATM 10.

Another condition may be satisfied if a USB reset command has been issued by either the transaction program 90 or the maintenance program 100.

If any of the conditions stored in the rules engine 135 are satisfied, then the filter criterion will be satisfied.

If the filter criterion is satisfied, then the fault state may be stored in a fault log (step 204) on the ATM 10.

If the filter criterion is not satisfied, then the non-proprietary SNMP portion 132 will prepare a trap based on the fault state (step 206), and then transmit the prepared trap to the remote management center 190 (step 208) in a conventional manner. The remote management center 190 will then action that fault signal in a conventional manner.

It will now be apparent that this embodiment has the advantage that under certain conditions, a fault state will not be communicated to the remote management center 190. These conditions can be selected so that when a fault state is expected (for example, because it is a transient state that cannot be avoided) then no traps are sent. This ensures that network bandwidth is not used up by irrelevant messages, and also ensures that service personnel are not deployed to correct transient fault states that may have been corrected automatically by the time the service personnel arrive at the ATM.

Another embodiment of the present invention will now be described with reference to FIG. 5, which is a simplified block diagram of the architecture of an SST 510, in the form of an ATM.

The ATM 510 comprises a plurality of modules for enabling transactions to be executed and recorded by the ATM 510. These ATM modules comprise: a controller module 514, a display module 520, a card reader/writer module 522, an encrypting keypad module 524, a receipt printer module 526, a cash dispenser module 530, a wireless communication module 531 having a Bluetooth (trade mark) transceiver, a journal printer module 532 for creating a record of every transaction executed by the ATM 510, and a network connection module 534 (in the form of an enhanced network card) for accessing a remote authorization system (not shown) and a remote state of health management system (not shown).

The controller 514 comprises a BIOS 540 stored in non-volatile memory, a microprocessor 542, main memory 544, storage space 546 in the form of a magnetic disk drive, and a display controller 548 in the form of a graphics card.

The display module 520 is connected to the controller module 514 via the graphics card 548 installed in the controller module 514. The other ATM modules (522 to 534) are connected to the ATM controller 514 via a device bus 536 and one or more internal controller buses 538.

When the ATM is powered up, a secure booting-up process is performed, in which the main memory 544 is loaded with an ATM operating system kernel 552 and an agent environment manager 554 in a secure manner. Furthermore, the ATM modules (520 to 534) and other components within the controller module (540, 546, 548) are authenticated.

As is well known in the art, the operating system kernel 552 is responsible for memory management, process management, task management, and disk management.

The agent manager 554 implements a Java Virtual Machine for allowing agents to execute within a controlled agent environment 556. One embodiment of a feasible controlled agent environment 556 is illustrated in more detail in FIG. 6. A further embodiment is disclosed later in this document. Neither embodiment should be considered as limiting the scope of the invention as detailed in the acclaimed appended hereto.

Figure 6:
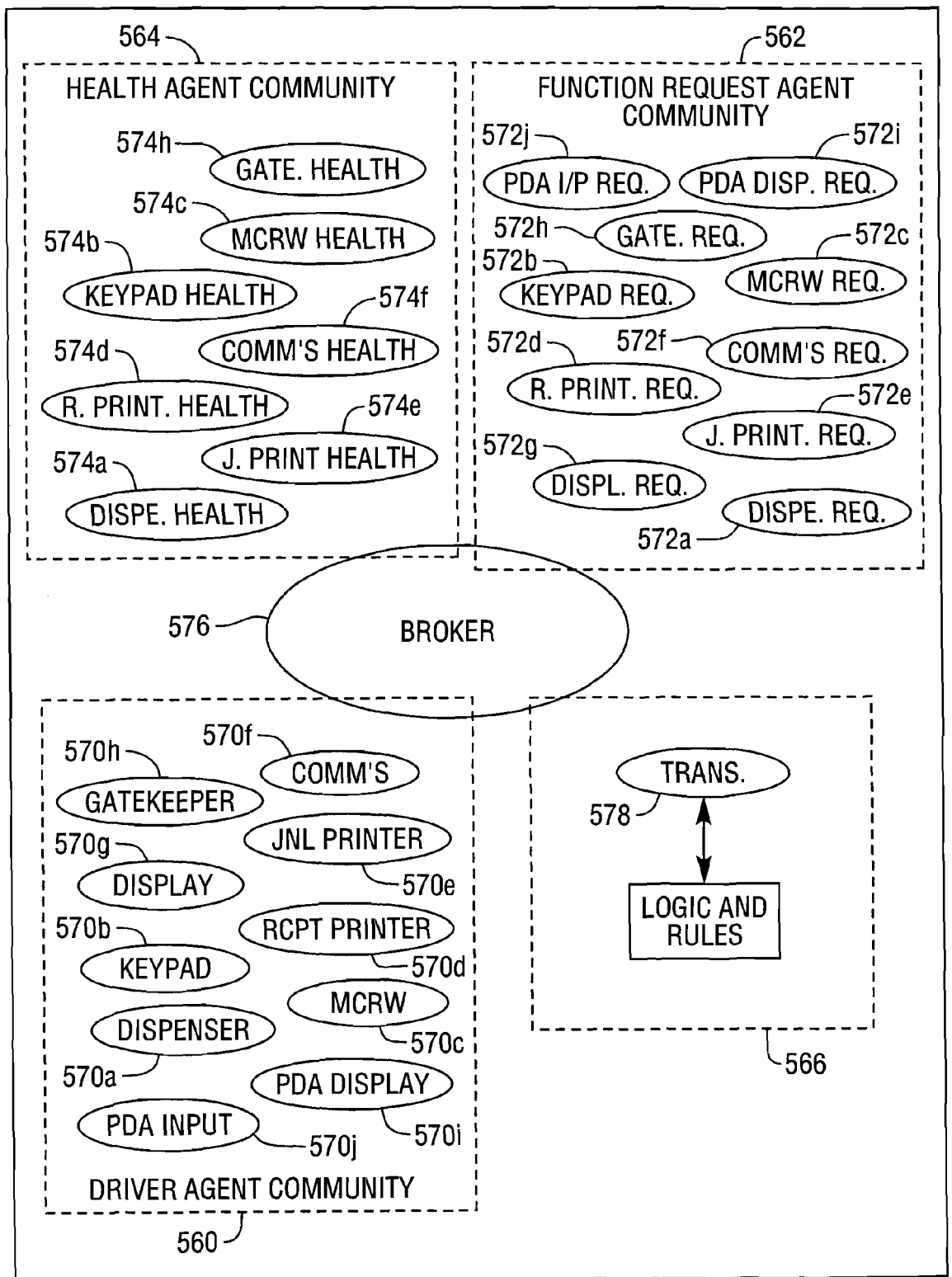
FIG. 6 is a schematic diagram showing the software architecture of a control application executing in memory of the terminal of FIG. 5.

Referring to FIG. 6, the agent environment 556 includes three agent communities: a driver agent community 560, a function request agent community 562, and a health agent community 564; and a logic engine 566.

Each community 560, 562, 564 contains agents that can interact with other agents within that community, and with associated agents in other communities. Each community 560, 562, 564 also contains an agent infrastructure to instantiate agents and to allow agents to execute.

The Driver Agent Community

The driver agent community 560 includes a driver agent 570 for each module in the ATM 510 (apart from the controller module 514), namely: a dispenser driver agent 570a, a keypad driver agent 570b, a card reader driver agent 570c, a receipt printer driver agent 570d, a journal printer driver agent 570e, a network card driver agent 570f, a display driver agent 570g, and a gatekeeper driver agent 570h for the wireless communications module 531. The driver agent community 560 also includes a small display agent 570i and a wireless input agent 570j for outputting information to and receiving information from a wireless device that may be used by an ATM user for entering a transaction at the ATM. The small display agent 570i renders information for viewing on a small display, such as a display incorporated into a cellular radio-frequency telephone (hereinafter a "cell phone"), a personal digital assistant (PDA), or such like. The wireless input agent 570j receives user entries from the cell phone or PDA. The gatekeeper driver agent 570h monitors information transmitted from a user's wireless device.

Each of these driver agents 570 translates generic commands to hardware-specific low-level commands for operating the associated module. Most of the drivers 570 also report status information from sensors or other indicators in their associated modules.

The driver agent community 560 accesses a broker agent 576 that performs administrative tasks, as will be described in more detail below. The broker agent 576 is not a driver agent 570 and is not part of the driver agent community 560, but the broker agent 576 is shown overlapping the community 560 in FIG. 6 because the broker agent 576 stores information about the driver agents.

The Function Request Agent Community

The function request agent community 562 includes a function request agent 572 for each module in the ATM 510 (apart from the controller module 514), namely: a dispenser function request agent 572a, a keypad function request agent 572b, a card reader function request agent 572c, a receipt printer function request agent 572d, a journal printer function request agent 572e, a network card function request agent 572f, a display function request agent 572g, and a gatekeeper function request agent 572h. The function request agent community 562 also includes a function request agent for outputting information to a wireless device, referred to as a small display function request agent 572i, and a function request agent for receiving information from a wireless device, referred to as a wireless input function request agent 572j.

The function request agent community 562 also accesses the broker agent 576. The broker agent 576 is not a function request agent 572 and is not part of the function request agent community 562, but the broker agent 576 is shown overlapping the community 562 in FIG. 6 because the broker agent 576 provides information to the function request agents 572.

Each of the function request agents 572 translates generic commands from the logic engine 566 to a format suitable for an associated driver agent 570, so that the function request agents 572 provide a consistent interface to the logic engine 566. An associated driver agent is a driver agent that provides suitable functions for the function request agent; for example, a dispenser driver agent is an associated driver agent for a dispenser function request agent.

The function request agents 572 also provide additional features for the logic engine 566 (for example, obtaining information from the driver agents 570 about the capabilities of the modules, the configuration of the modules, and such like).

The Health Agent Community

The health agent community 564 comprises a health agent 574 for each module in the ATM 510 (apart from the controller module 514 and the display module 520), namely: a dispenser health agent 574a, a keypad health agent 574b, a card reader health agent 574c, a receipt printer health agent 574d, a journal printer health agent 574e, a network card health agent 574f, and a gatekeeper health agent 574h.

Each health agent 574 collates and stores status information for its associated driver agent 572. The health agent community 564 also accesses the broker agent 576. The broker agent 576 is not a health agent 574 and is not part of the health agent community 564, but the broker agent 576 is shown overlapping the community 564 in FIG. 6 because the broker agent 576 provides information to the health agents 574.

A Health Agent

Figure 7:
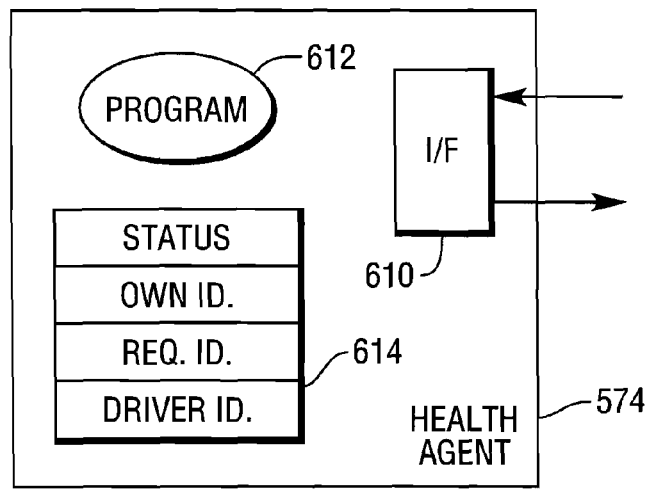
FIG. 7 is a schematic diagram of a health agent of the control application of FIG. 6.

A typical health agent 574 is illustrated in FIG. 7. The agent 574 has an agent interface 610, an operation program 612, and a data storage area 614.

The agent 574 issues requests for information to, and receives responses and status information from, an associated driver agent 570 via the agent interface 610. The agent 574 also sends status information to an associated function request agent 572 via the agent interface 610.

The operation program 612 operates on the status information, for example, to predict faults and determine the operational status of the associated module.

Alternatively, SNMP traps can be utilized instead of the agent 574 issuing requests for information, as is known in the art.

The data storage area 614 stores status information and address information. The status information includes, for example, the state of sensors or other indicators within the module, previous faults, a log of status reports, and such like. The address information stores a contact identifier for the agent (that is, its own contact identifier) and contact identifiers of other agents it communicates with, namely, an associated driver agent 570 and an associated function request agent 572.

As mentioned briefly above, in known ATM health monitoring systems, each health agent operates in the background to monitor the functions of the modules. When a module, such as a cash dispenser, operates, sensors are activated in a sequence as notes are transported, shutters are opened and closed, diverter gates are activated, and such like. The dispenser health agent 574a monitors the operation of these sensors to predict possible failures and to inform a server (such as a replenisher or a technician) when media needs replenished or a reject bin needs emptied. This is analogous to fault prediction and management as is presently implemented by some ATMs.

If the dispenser health agent 574a detects that some service work needs to be performed, then the health agent 574a informs the dispenser function request agent 572a, which in turn requests the transaction and logic flow agent 578 to request via the network module 534 a service visit.

The agent environment 556 may include system agents that are not specific to one particular module, but monitor the health of the entire ATM 510 at the system level, and allow fault diagnosis and tests to be executed.

Figure 8:
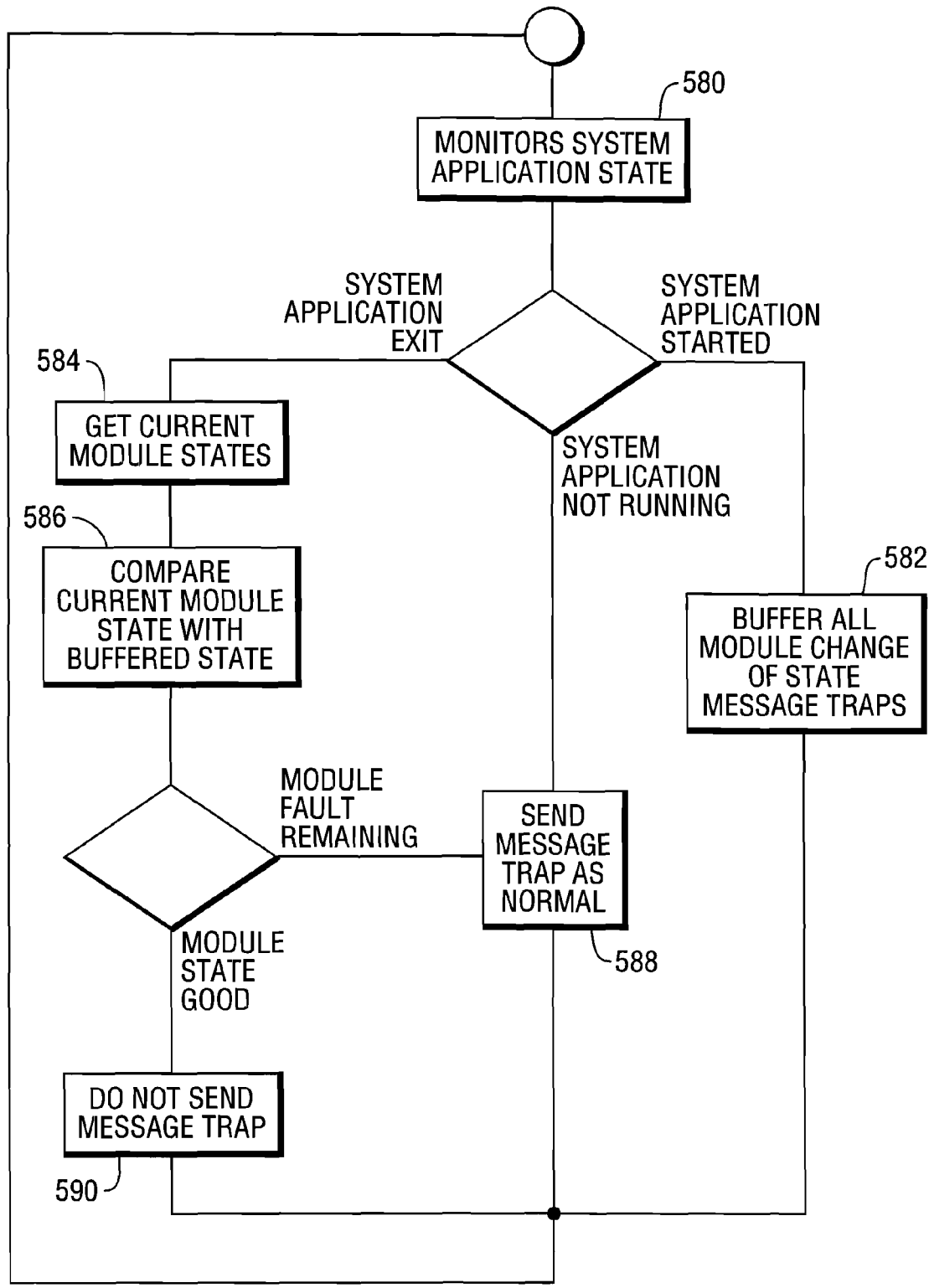
FIG. 8 is a flow diagram of the operation of an agent, in accordance with the embodiment of FIG. 5.

As illustrated in FIG. 8, in accordance with this embodiment, the SNMP agent is modified to intelligently determine when the software application or service engineer has initiated a module only power down in, for example, in order to recover a failed module.

When a module only power down is detected, by the terminal being placed in a diagnostic mode by an engineer, then the SNMP agent will record and buffer the change of state messages but will not immediately send them up to the management system. The SNMP agent will wait for the devices to be powered back on, and the terminal to be taken out of the diagnostic mode into a normal operating mode, and will then determine what if any of the buffered state changes require to be sent up to the management system.

This operation can be explained most clearly with reference to the flow diagram, FIG. 8, in which the control or system application state is monitored to determine if the system application is in a normal operational or diagnostic state (box 780). Once the system is in a diagnostic state, if the application starts the shut down of a module then none of the health signals initiated by the agent are sent to the remote system state of health management server and instead they are buffered (box 782). The agent then monitors the activation of the module, and the return from diagnostic state to normal operational state and once the control application reactivates the module the agent again detects the state of health of the module (box 784) and compares it with the original state of health prior to power down of the module (box 786). If the new state of health of the module is good then no signal is sent to the remote server (box 788). However, if the state of health is still characteristic of a fault or problem with the module then the signal is sent to the remote server (box 790), whereupon appropriate action is instigated.

Alternative Embodiment

Another embodiment of the present invention will now be described with reference to FIG. 9, which shows an agent environment 800. The agent environment 800 is implemented on the same hardware (that is, the ATM modules) as the embodiment of FIG. 5.

The agent environment 800 has a module control agent community 802 comprising a module control agent 804 for each module in the ATM.

The environment also has a control agent broker 806 and a logic engine 808. The logic engine 808 comprises a transaction flow agent 810 and a rules and business logic file 812.

In this embodiment, each control agent 804 combines the functions of a driver agent, a function request agent and a health agent, from the previous embodiment.

Figure 5:
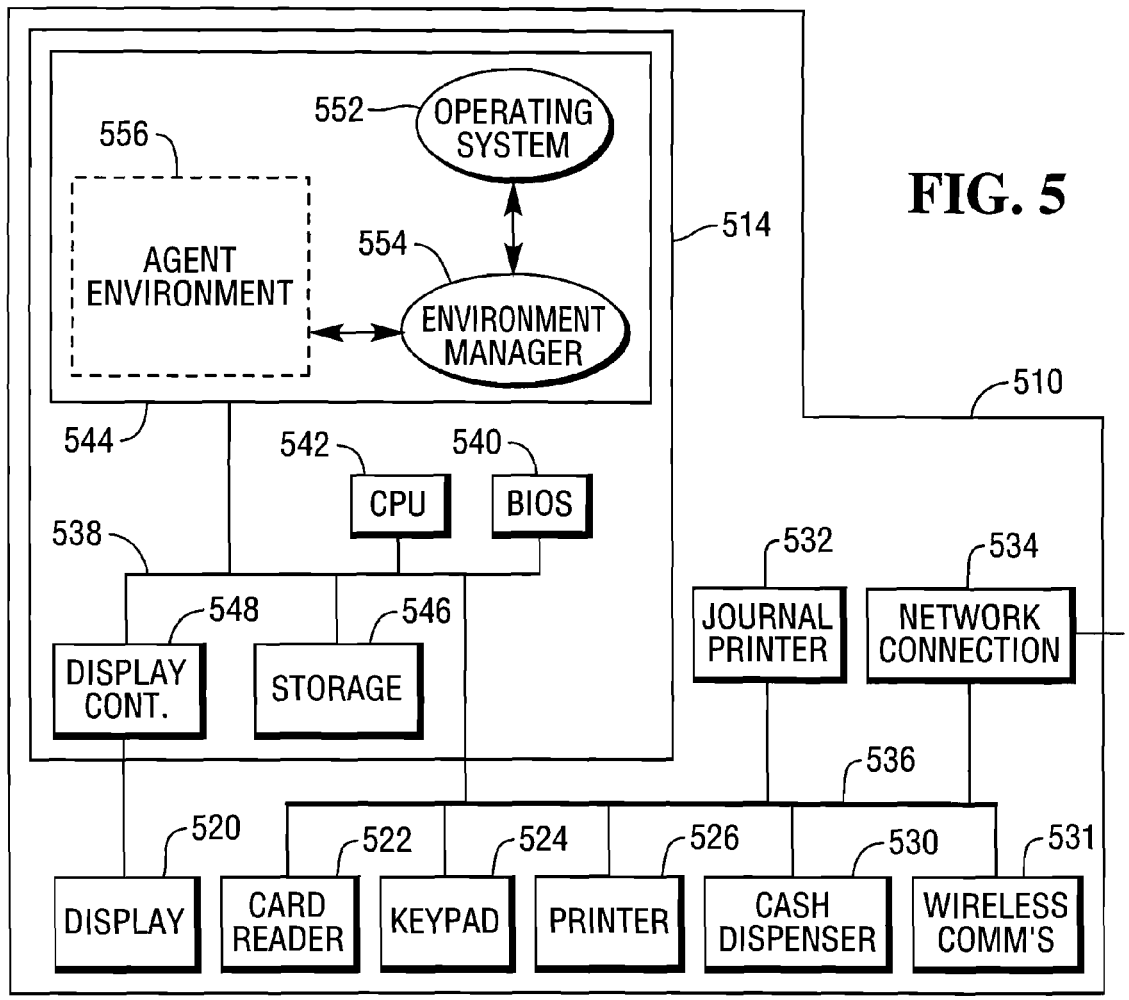
FIG. 5 is schematic diagram of the architecture of a self-service terminal in accordance with another embodiment of the present invention.

The transaction flow agent 810 operates in a similar manner to the transaction flow agent in the embodiment of FIG. 5.

Various modifications may be made to the above described embodiments within the scope of the invention. For example, in other embodiments, if the filter criterion is satisfied, then the fault state may be deleted instead of stored in a fault log.

In other embodiments, the self-service terminal may not be an ATM, but may be an information kiosk, a financial services center, a bill payment kiosk, a lottery kiosk, a postal services machine, a check-in and/or check-out terminal such as those used in the retail, hotel, car rental, gaming, healthcare, and airline industries, and the like.

Figure 9:
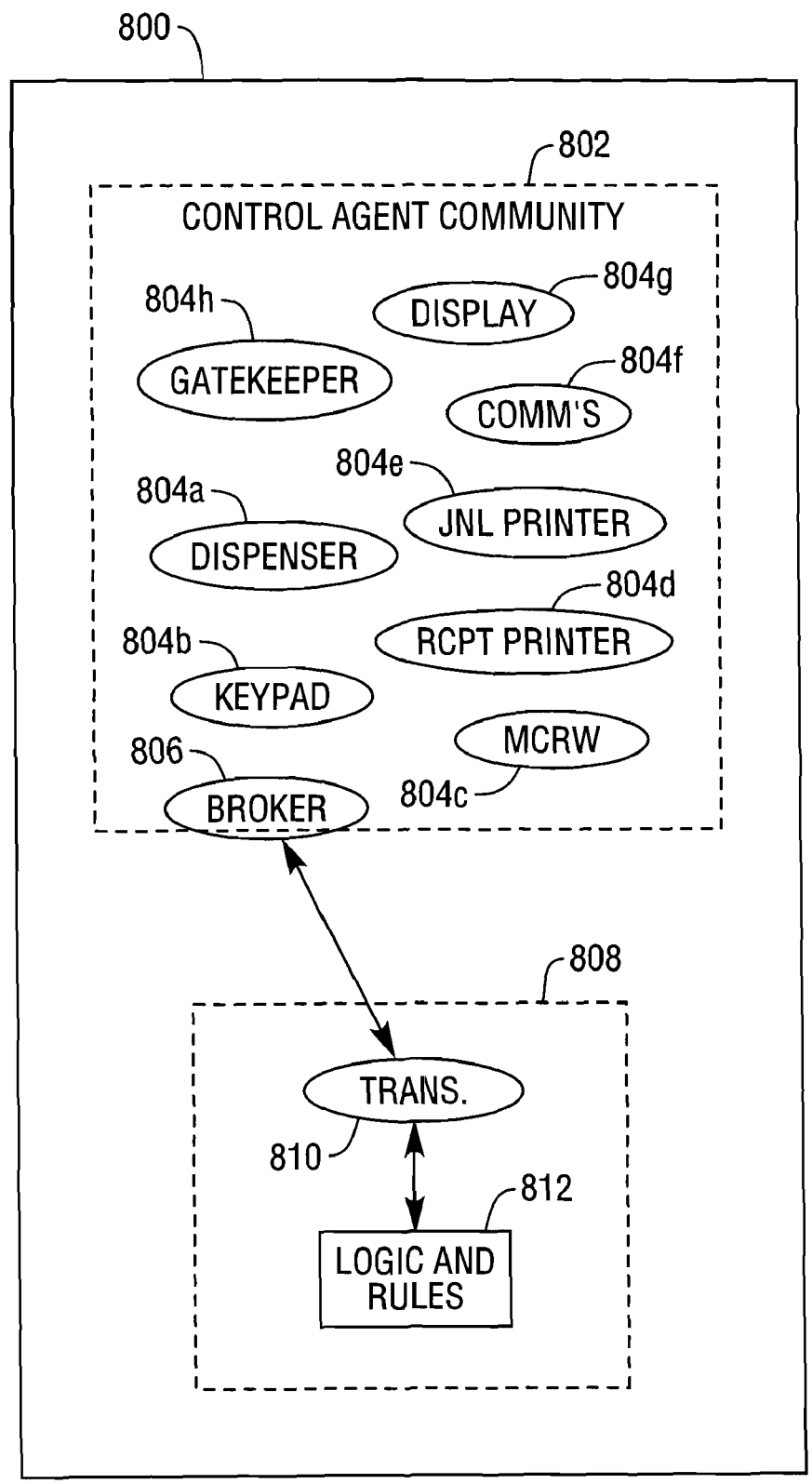
FIG. 9 is a schematic diagram of an alternative agent environment.

For the FIG. 5 and FIG. 9 embodiments, instead of detecting the state of the terminal (normal operation or diagnostic mode) sensors on the module may detect if a loss of power at a terminal is a power down by an engineer or the control system or an erroneous loss of power, in much the same way that a pc can determine if a loss of power is intentional.

The invention claimed is:

1. A self-service terminal comprising:
a pc core;
at least one module coupled to the pc core;
a control application executing on the pc core for controlling the operation of the terminal; and
a management application executing on the pc core and arranged to (i) monitor state of health of the pc core, the control application, and the at least one module, (ii) detect a fault state at any of the pc core, the control application, and the at least one module, and upon detection of the fault (iii) obtain operating information from the control application (iv) access a rules engine including conditions associated with a filter criterion, (v) compare the operating information to the conditions in the rules engine to ascertain if at least one of the conditions is satisfied, and (vi) transmit a fault signal from the terminal only if none of the conditions are satisfied.

2. A terminal according to claim 1, wherein the management application uses a context filter to monitor the control application and ascertain if a filter criterion is satisfied.

3. A terminal according to claim 1, wherein the control application comprises:
a platform portion for controlling the modules in the terminal;
a transaction portion for executing customer transactions; and
a maintenance portion for providing diagnostic and maintenance support to service personnel using the terminal.

4. A terminal according to claim 1, wherein the management application stores fault states in a log for subsequent review, even if the fault states are never communicated as fault signals.

5. A terminal according to claim 1, wherein the management application includes an SNMP agent operable to send a trap as a fault signal if the filter criterion is not satisfied.

6. A terminal according to claim 1, wherein the management application caches a received fault state and compares it with a subsequent state when the filter criterion is no longer satisfied.

7. A terminal according to claim 1, wherein the management application allows a recovery agent to register with the management application, and in response to a valid registration request from the recovery agent, the management application automatically adds one or more conditions to the filter criterion based on information provided in the registration request.

8. A method of operating a self-service terminal comprising a pc core and at least one module coupled to the pc core, the method comprising:
monitoring state of health of the pc core and the at least one module;
detecting a fault state at either of the pc core and the at least one module; and
upon detection of the fault
obtaining operating information from the control application;
accessing a rules engine including conditions associated with a filter criterion;
comparing the operating information to the conditions in the rules engine to ascertain if at least one of the conditions is satisfied; and
transmitting a fault signal from the terminal only if none of the conditions are satisfied.

9. A method according to claim 8, wherein the filter criterion is satisfied by the terminal being in a supervisor mode.

10. A method according to claim 8, wherein the filter criterion is satisfied if the control application has issued a reset command to the at least one module immediately prior to the fault state being detected.

11. A method according to claim 8, wherein the filter criterion is satisfied if the control application includes a maintenance portion that is executing when the fault state is detected.

12. A method according to claim 8, wherein the filter criterion is satisfied if a module reset command has been issued to reset the at least one module.

13. A method according to claim 8, wherein the filter criterion is satisfied if a USB reset command has been issued.

14. A method according to claim 8, wherein the method further includes storing detected fault states in a log, even if no fault signal is sent for those fault states.

15. A method according to claim 8, wherein the method further comprises transmitting the detected fault state log to a remote management system in response to a request therefor.

16. A method of operating a self-service terminal comprising a pc core and at least one module coupled to the pc core, the method comprising:
monitoring state of health of the pc core and the at least one module;
detecting a fault state at either of the pc core and the at least one module;
monitoring the control application to ascertain if a filter criterion is satisfied, wherein the filter criterion is satisfied by the terminal being in a supervisor mode; and
transmitting a fault signal from the terminal only if the filter criterion is not satisfied.

17. A method of operating a self-service terminal comprising a pc core and at least one module coupled to the pc core, the method comprising:
monitoring state of health of the pc core and the at least one module;
detecting a fault state at either of the pc core and the at least one module;
monitoring the control application to ascertain if a filter criterion is satisfied, wherein the filter criterion is satisfied if the control application has issued a reset command to the at least one module immediately prior to the fault state being detected; and
transmitting a fault signal from the terminal only if the filter criterion is not satisfied.

18. A method of operating a self-service terminal comprising a pc core and at least one module coupled to the pc core, the method comprising:
monitoring state of health of the pc core and the at least one module;

detecting a fault state at either of the pc core and the at least one module;

monitoring the control application to ascertain if a filter criterion is satisfied, wherein the filter criterion is satisfied if the control application includes a maintenance portion that is executing when the fault state is detected; and transmitting a fault signal from the terminal only if the filter criterion is not satisfied.

19. A method of operating a self-service terminal comprising a pc core and at least one module coupled to the pc core, the method comprising:

monitoring state of health of the pc core and the at least one module;

detecting a fault state at either of the pc core and the at least one module;

monitoring the control application to ascertain if a filter criterion is satisfied, wherein the filter criterion is satisfied if a module reset command has been issued to reset the at least one module; and transmitting a fault signal from the terminal only if the filter criterion is not satisfied.

20. A method of operating a self-service terminal comprising a pc core and at least one module coupled to the pc core, the method comprising:

monitoring state of health of the pc core and the at least one module;

detecting a fault state at either of the pc core and the at least one module;

monitoring the control application to ascertain if a filter criterion is satisfied, wherein the filter criterion is satisfied if a USB reset command has been issued; and transmitting a fault signal from the terminal only if the filter criterion is not satisfied.

* * * * *